July 17, 1928.
H. H. DEULEY
1,677,275
GLASS TEEMING APPARATUS
Filed June 23, 1926
3 Sheets-Sheet 3
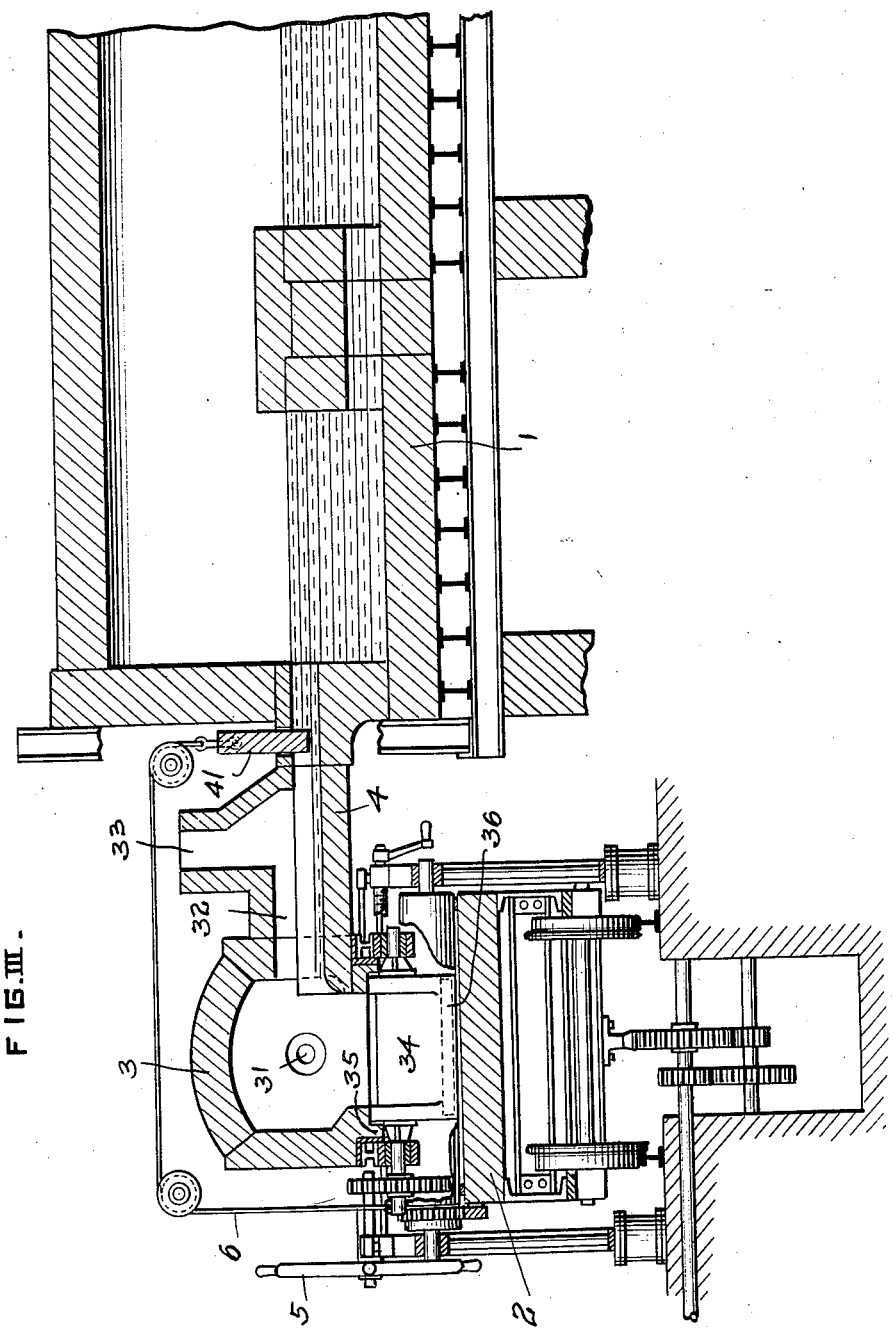
WITNESSES
INVENTOR
Harvey H. Deuley
by Christy and Christy
his attorneys Patented July 17, 1928.

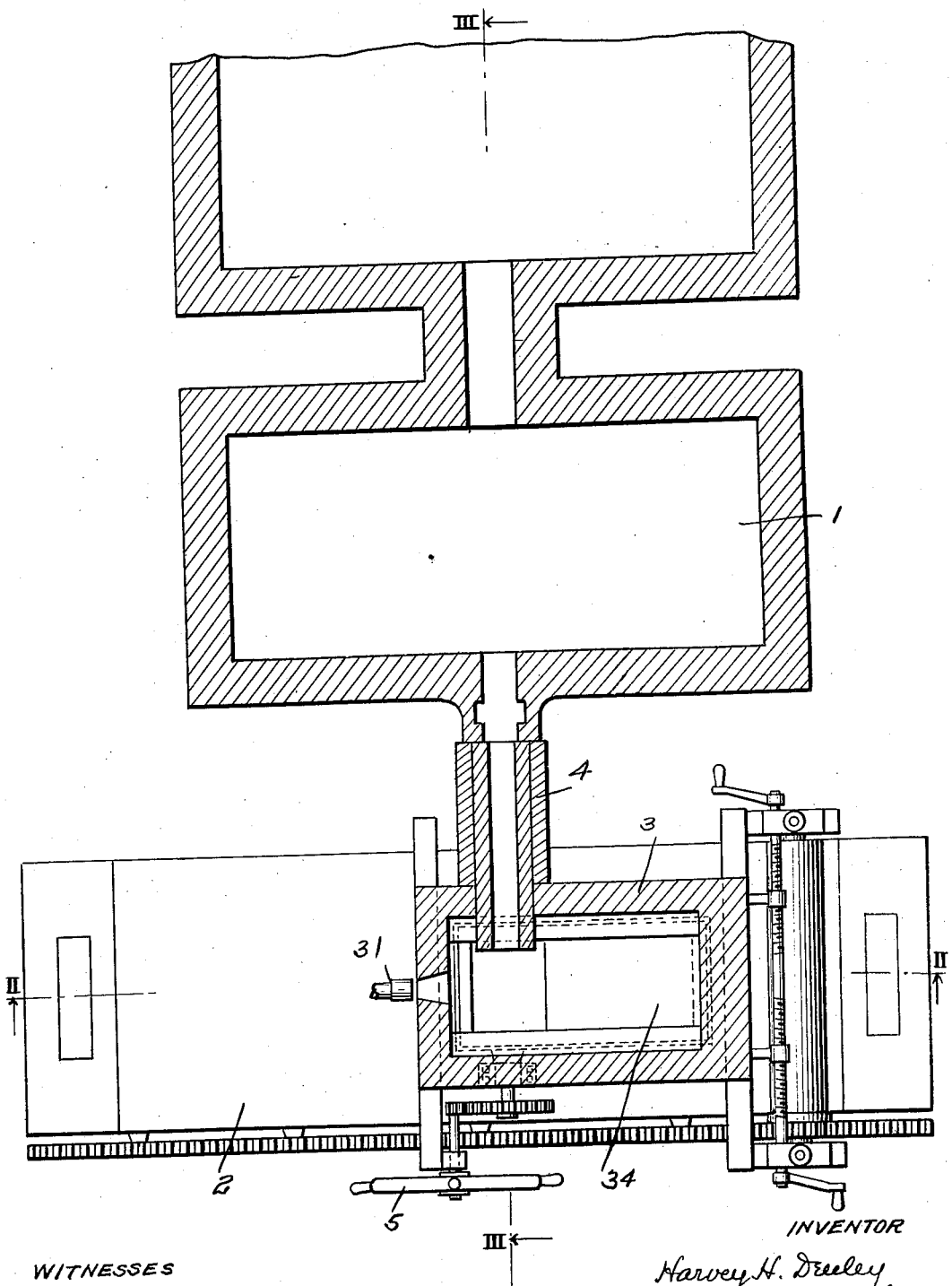

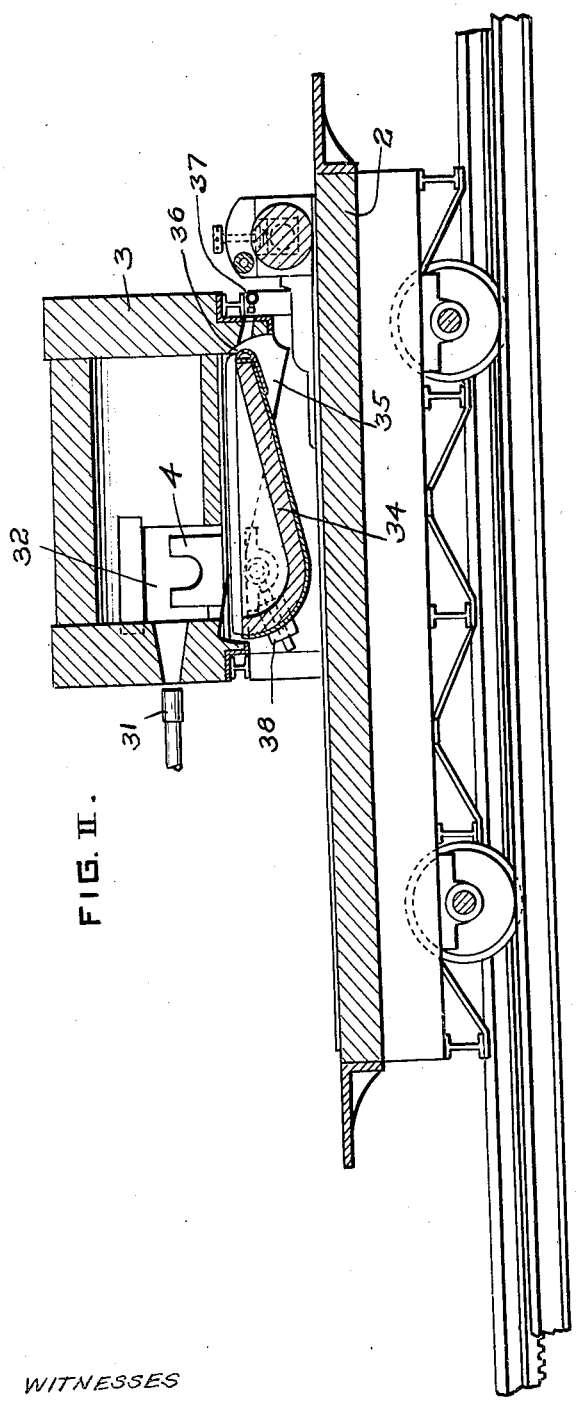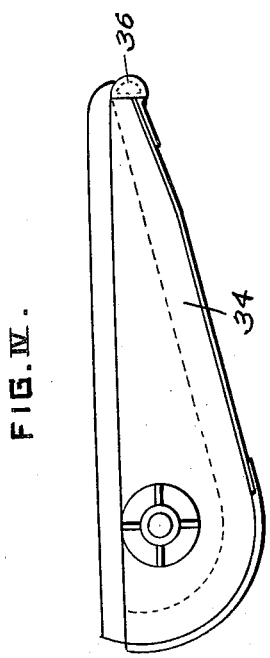

1,677,275

UNITED STATES PATENT OFFICE.

HARVEY H. DEULEY, OF PARKERSBURG, WEST VIRGINIA.

GLASS-TEEMING APPARATUS.

Application filed June 23, 1926. Serial No. 117,967.

My invention relates to teeming apparatus for molten glass. It is applicable alike to apparatus for teeming glass to a plate-glass spreading table and to apparatus for teeming glass to a mold. The object is to deliver from a tank of molten glass and to other glass-working appliances segregated unit quantities of molten or plastic glass, and of accurately predetermined size. While in the accompanying drawings I show and shall describe the invention in application to apparatus for teeming to a plate-glass spreading table, its wider and general applicability, indicated above, will be recognized.

Fig. I is a view in horizontal section of a glass tank and a spreading table and of teeming apparatus in which my invention is embodied. Fig. II is a view in vertical section, on the plane indicated at II—II, Fig. I. Fig. III is a view partly in end elevation, partly in vertical section, on the plane indicated at III—III, Fig. I. Figs. II and III show the movable parts in alternate positions of operation. Fig. IV is a view in elevation of a certain part detached.

In these drawings a glass furnace is indicated at 1 and a plate-glass casting table is indicated at 2. Above the casting table and adjacent the furnace 1 is an auxiliary furnace 3. The main furnace communicates with the auxiliary furnace through a trough or spout 4, and through this trough or spout, it is apparent, molten glass may flow, from the batch in the main furnace to the auxiliary furnace. A slide 41 is movable vertically, to control and if need be entirely to cut off flow through the spout. The auxiliary furnace is heated by a burner 31 and the escape of the hot gases is through a passage 32 of which the trough or spout 4 forms the bottom wall, to a stack 33. The hot gases stream out counter-current to the advance of molten glass through the spout.

The bottom of the auxiliary furnace consists of a swinging and counterweighted ladle 34 for molten glass. The ladle 34 is pivoted on a horizontal axis and it is asymmetrical with respect to the vertical plane passing through such axis. When the ladle is empty its center of gravity is disposed at one side (to the left, Fig. II) of such vertical plane passing through its pivotal axis; but the shape is such that when the ladle is filled with molten glass the center of gravity is shifted to the other side (the right-hand side, Fig. II) of such vertical plane. Normally when empty the ladle stands in the closed position shown in Fig. II; but as molten glass flowing through spout 4 accumulates within it, the center of gravity is shifted, the counterweight is overbalanced, the ladle swings clockwise on its supports, and the molten glass accumulated within it is by gravity delivered to table 2. When the charge of glass within the ladle has been delivered, the center of gravity shifts again, and the counterweight is effective to cause the ladle 34 to swing again counterclockwise, to its normal position, closing the auxiliary furnace 3 beneath.

The ladle is carried on trunnions, for which proper bearings are provided in the supporting frame-work, and the side walls of the auxiliary furnace are extended in depending aprons 35, so that in all positions of ladle 34 the chamber is a closed chamber, except only at the rim across which molten glass flows from the down-swung ladle 34 to the table 2. The counterweight 38 is adjustable upon an arm or arms extending radially with respect to the center of turning of ladle 34 upon its trunnions, to the end that the apparatus may be adjusted for the automatic delivery of precisely the desired quantity of molten glass.

The asymmetrical ladle 34 as shown particularly in Figs. II and IV is, specifically, spoon-shaped and the trunnion support of the spoon-shaped ladle is at the deep end, and further the spout 4 delivers above that deep end. While I do not mean in this respect to place limitation upon my invention in its broader aspects, it will be perceived of this particular shape and of this particular arrangement that they are such as to provide for a considerable accumulation of molten glass within ladle 34 before the counterweight is overbalanced and the ladle 34 swings to delivery position.

Means are provided, both to preserve the rim of the ladle 34 against too rapid wear and to prevent clogging and fouling of the rim by accumulation of chilled glass. The means for preserving the rim against too rapid wear are found in water-cooling, indicated at 36. The rim will be formed of appropriate heat enduring material. The means for prevention of accumulation of chilled glass upon the rim of ladle 34 are found in the burners 37 which arranged in line project their flame directly upon the rim of the closed ladle.

While the ladle is adapted in the manner described, for automatic operation, it is susceptible to operation by particular means, which may either wholly take the place of or supplement the automatic operation first described. Such ladle swinging means may take the form of a hand-wheel 5 whose shaft is geared to one of the trunnions of the ladle 34, and manifestly the hand-wheel 5 may become a power-driven member. By such means the ladle may be held stationary and swung, wholly according to the will of the operator, or the ladle 34 having swung automatically to delivery position, it may by these means be returned at the will of the operator to its raised and charge-receiving position.

The slide 41, movable under gravity to spout-closing position, may be arranged for automatic coordinate operation with ladle 34. Means to that end are found in the lifting chain 6. When ladle 34 stands in the raised and charge-receiving position shown in Fig. II, the pull which it exerts, holds the slide 41 in raised position; as ladle 34 swings to delivery position, the slack afforded in chain 6 allows the slide 41 to descend by gravity, checking flow of molten glass through spout 4. Thus while delivery is being made, the flow from the tank 1 is checked. It preferably is not wholly checked, however, for it is desirable to have a small continuing flow, to prevent the freezing of slide 41 in closed position. In case the apparatus is to be put out of operation for repairs, the connection of chain 6 to the swinging ladle 34 may be broken and the slide 41 allowed to descend the full distance and to close off the spout 4 entirely.

The apparatus, it will be perceived, is organized for continuous and automatic operation, delivering periodically unit charges of molten glass of predetermined weight.

The drawings show in an exemplary way a movable table 2, adapted to advance beneath a stationary glass-spreading roll. Manifestly the charge-delivering apparatus in which the invention resides is in no way limited in its use to glass-spreading apparatus which include a movable table; manifestly it is equally applicable to apparatus in which the table is stationary and the spreading roll advances above it. Of course, in the alternative last suggested the charge-delivering apparatus will be spaced above the stationary table at a sufficient interval to allow the free advance beneath it and above the table of the glass-spreading roll. And manifestly, when a more general view of the matter is taken, the charge delivering apparatus in which my invention resides is not limited in its serviceability to plate-glass spreading tables; it is serviceable wherever molten or plastic glass is to be delivered periodically in predetermined unit charges, whether delivery be to a table top, or to a mold, or to other receptacle.

It is characteristic of the apparatus of my invention that it may remain indefinitely inactive, and still carry in its measuring receptacle a charge of glass in molten condition.

I claim as my invention:

1. Apparatus for the delivery of molten glass in a succession of unit charges including a ladle pivoted on a horizontal axis asymmetrical in shape with respect to a vertical plane passing through its pivotal axis, its center of gravity when empty lying on one side of such vertical plane and its center of gravity when filled with molten glass lying on the other side of such vertical plane.

2. In apparatus for delivering molten glass in a succession of unit charges, the combination with a glass furnace, of an auxiliary furnace in communication therewith, the bottom of such auxiliary furnace being a ladle pivoted on a horizontal axis, the ladle being asymmetrical in shape with respect to a vertical plane passing through its pivotal axis, whereby the center of gravity is caused to shift from one side to the other of such vertical plane as the ladle is filled.

3. In apparatus for delivering molten glass in a succession of unit charges, and in combination with a glass furnace, a receptacle rotatable upon its axis and non-symmetrical in shape with respect to the vertical plane in which such axis lies, said receptacle being provided with an adjustable counterweight, and means for conveying molten glass from the furnace to such receptacle.

4. In apparatus for delivering molten glass in a succession of unit charges, the combination with a glass furnace, of an auxiliary furnace, and a counterweighted receptacle rotatable upon a horizontal axis and constituting the bottom of such auxiliary furnace the opposite sides of the receptacle extending perpendicularly to the axis of rotation and the side walls of the auxiliary furnace extending in depending aprons with which the sides of the receptacle in all its positions of rotation make closure.

5. In apparatus for delivering molten glass in a succession of unit charges, the combination with a glass furnace, of an auxiliary furnace having a counterweighted bottom, a passage for molten glass from the glass furnace to such auxiliary furnace, a closure movable to and from closing position in such passageway, and a stack leading from such passageway at a point in its extent intermediate between said auxiliary furnace and said closure.

6. In apparatus for delivering molten glass in a succession of unit charges, the combination with a glass furnace, of an auxiliary furnace having a counterweighted bottom, a passageway for molten glass from the glass furnace to such auxiliary furnace, and a stack opening from said passage.

7. In apparatus for delivering molten glass in a succession of unit charges, the combination with a glass furnace, of an auxiliary furnace having a counterweighted swinging bottom, a passage for molten glass from the glass furnace to such auxiliary furnace, a closure movable to and from closing position in such passage, said closure being coordinated in its movement to the movement of the swinging bottom.

In testimony whereof I have hereunto set my hand.

HARVEY H. DEULEY.